United States Patent
Gallarda et al.

(10) Patent No.: US 7,761,182 B2
(45) Date of Patent: Jul. 20, 2010

(54) AUTOMATIC DEFECT REPAIR SYSTEM

(75) Inventors: Harry Gallarda, San Jose, CA (US); Steven Barnes, Sunnyvale, CA (US); Lakshman Srinivasan, Cupertino, CA (US); Wayne Wang, San Jose, CA (US)

(73) Assignee: Photon Dynamics, Inc., San Jose, CA (US)

( * ) Notice: Subject to any disclaimer, the term of this patent is extended or adjusted under 35 U.S.C. 154(b) by 1195 days.

(21) Appl. No.: 11/336,655

(22) Filed: Jan. 20, 2006

(65) Prior Publication Data

US 2006/0226865 A1    Oct. 12, 2006

Related U.S. Application Data

(60) Provisional application No. 60/646,111, filed on Jan. 21, 2005.

(51) Int. Cl.
*G06F 19/00* (2006.01)
(52) U.S. Cl. .......................................... 700/121; 700/98
(58) Field of Classification Search ........... 700/98–108, 700/121
See application file for complete search history.

(56) References Cited

U.S. PATENT DOCUMENTS

| | | | |
|---|---|---|---|
| 6,205,239 B1 * | 3/2001 | Lin et al. ..................... | 382/149 |
| 6,539,106 B1 | 3/2003 | Gallarda et al. | |
| 6,614,923 B1 | 9/2003 | Shishido et al. | |
| 6,759,655 B2 | 7/2004 | Nara et al. | |
| 7,142,992 B1 * | 11/2006 | Huet et al. ..................... | 702/58 |
| 7,394,534 B1 * | 7/2008 | Huet et al. ............... | 356/237.4 |
| 2005/0147286 A1 * | 7/2005 | Lee et al. ..................... | 382/141 |
| 2005/0254045 A1 * | 11/2005 | Weiss et al. ............... | 356/237.5 |
| 2006/0265145 A1 * | 11/2006 | Huet et al. ..................... | 702/35 |

FOREIGN PATENT DOCUMENTS

WO    WO 2006/078916 A2    7/2006

OTHER PUBLICATIONS

Qiu et al., "Automatic Repair in AMLCD," *Proc. SPIE Advanced Flat panel Display Technologies*, 2174:98-106 (1994).
International Search Report of Jan. 9, 2008 in PCT application No. PCT/US06/02058.
Written Opinion of Jan. 9, 2008 in PCT application No. PCT/US06/02058.

* cited by examiner

*Primary Examiner*—Kidest Bahta
(74) *Attorney, Agent, or Firm*—Townsend and Townsend and Crew LLP

(57) ABSTRACT

A repair system for flat panel display (FPD) substrates performs a number of operations, such as automatic image capture and processing, automatic defect classification, automatic repair classification, and repair macro (instruction) generation software. Defect classification, repair classification, and repair macro generation are based on an open architecture and can address any number of use-cases through the use of multi-tiered classifiers, and thus a wide variety of panel designs may be repaired within a single repair tool. The multi-tiered set of classifiers, e.g., defect classifier, repair classifier, enables an efficient decision-making repair process with capability for customization. The multi-tiered classifiers are optionally extended to support statistical learning (both online & batch) and active learning, in the context of a supporting database of defects and associated tools. The classifiers and recipe rules may be automatically or semi-automatically improved over time, incorporating lessons learned by operators while judging defect or repair needs.

52 Claims, 15 Drawing Sheets

AUTOMATIC DEFECT REPAIR SYSTEM

CROSS-REFERENCES TO RELATED APPLICATIONS

The present application claims priority under 35 U.S.C. 119(e) from application Ser. No. 60/646,111, filed Jan. 21, 2005 entitled "Automatic Defect Repair System", the content of which is incorporated herein by reference in its entirety.

BACKGROUND OF THE INVENTION

The present invention relates to the flat panel displays based on liquid crystal display (LCD) and other related display technologies such as organic light emitting devices (OLED), and more particularly to the inspection of components formed on such displays.

During the manufacturing of LC displays, large clear plates of thin glass are used as a substrate for the deposition of thin film transistor (TFT) arrays. Usually, several independent TFT arrays are contained within one glass substrate plate and are often referred to as TFT panels. Alternatively, an active matrix LCD, or AMCLD, covers the class of displays utilizing a transistor or diode at every subpixel, and therefore encompasses TFT devices, such glass substrate plates may also be referred to as AMLCD panels. Flat panel displays may also be fabricated using any of the OLED technologies and though typically fabricated on glass, may also be fabricated on plastic substrate plates.

TFT pattern deposition is performed in a multitude of stages where in each stage, a particular material (such as a metal, indium tin oxide (ITO), crystalline silicon, amorphous silicon, etc.) is deposited on top of a previous layer (or glass) in conformity with a predetermined pattern. Each stage typically includes a number of steps such as deposition, masking, etching, stripping, etc.

During each of these stages and at various steps within each stage, many production defects may occur that may affect the electrical and/or optical performance of the final LCD product. Such defects include but are not limited to metal protrusion 110 into ITO 112, ITO protrusion 114 into metal 116, a so-called mouse bite 118, an open circuit 120, a short 122 in a transistor 124, and a foreign particle 126, as shown in FIG. 1. Other defects include mask problems, over or under etching, etc.

Even though the TFT deposition processes are tightly controlled, defect occurrence is unavoidable. This limits the product yield and adversely effects production costs. Typically, the TFT arrays are inspected using one or multiple Automated Optical Inspection (AOI) system(s) following critical deposition stages and by an opto-electrical inspection machine, also referred to as array tester or array checker (AC) to test the finished TFT arrays. Commonly AOI and AC systems provide defect coordinates; they do not provide high resolution images required to classify defects as killer, reparable or just imperfections not affecting the TFT array performance (so called process defects). The defect coordinate information is passed to a TFT array repair tool, also referred to as array saver (AS), and such classification is conventionally done manually by the TFT array repair machine operator.

The average number of defects per plate may vary from one TFT array manufacturer to another and from one manufacturing plant to another. Typically, the defect review and repair capacity within the TFT array fabrication line is sized to process 300-400 defects per $7^{th}$ generation plates. Typically 5 to 10% of defects per plate are assumed to require repair.

Since the TFT array features are typically very small (sub-pixel size may be 80×240 μm and up to 216×648 um for large 40 inch LCD televisions made from $7^{th}$ generation plates), the array repair tool includes a microscope to perform a defect review to decide whether the defect is repairable. The microscope field of view is small (ranging from 100×100 μm to 2×2 mm) relative to the plate size (typically 2.1×2.4 m). The microscope is installed on a precision XY stage so that it could be dispatched from one defect to another. The defect coordinates are known from inspections carried out earlier by AOI and AC inspection systems. The glass plate remains immobilized under the XY stage by means of a vacuum chuck during the defect review and repair. Following the review, the repairable defects are typically treated by means of laser trimming, laser welding or by bridging open line defects typically using a chemical vapor deposition (CVD) technique.

The above series of general events is typical of all array repair tools. However, because the number, type, locations, size/degree of defects often vary from panel to panel, a means to pass judgment is required at almost all of the tool steps following capture of the defect images—for example, whether an image is truly a defect rather than nuisance, what kind of defect has been found, whether or not a specific defect needs repair, what kind of repair is required, what repair parameters are needed, what is the next defect to be repaired, and so forth. Many repair tools combine tool operation with human operator judgment and intervention to identify, classify, and then repair such defects.

FIGS. 2 and 3 show two defect repair examples in cross sections. Metal protrusion defect 110 is shown in FIG. 2A (see FIG. 1 for top view). In this example, after identifying and classifying the defect 110, a repair recipe is created, and then executed to remove the protrusion, as shown in FIG. 2B. FIGS. 3A-3E represent the repair steps performed to correct an open path between metal lines 32 and 34 (See defect in 120 FIG. 1). In this example, a laser 36 is used to break through ("zap") the passivation layer 38 and cut into the metal lines. Then, a means to deposit material (in this case, a chemical vapor gas and moving laser energy source) is introduced to create contact electrodes 42 and 44 on the metal lines 32 an 34. Thereafter a metal line 46 is formed to connect the two metal lines 32 and 34. In both examples, the repair function of the tool must accurately locate the defect or portions of the defect area to be repaired, and the repair process must be specified for the particular defect type. Since not all panel fabrication processes are identical, parameters related to power, spot size, gas flow or other material deposition parameters, and so forth may need to be adjusted on a per panel or per panel product basis.

As shown in FIG. 4, once the defect image is taken 402, an operator reviews the image 403, categorizes the potential defects into nuisance and defect categories such as open, short, and others as illustrated in FIG. 1, and decides whether or not a repair is necessary 404. If no repair is necessary, the operator instructs the tool to move to the next defect 405 and the process for image capture and defect classification is repeated. If the operator decides that a repair is needed, he/she then determines the kind of repair needed (for example, a cut or a perhaps a connection), and sets the basic repair functions (such as laser cut) parameters including determining the start and end points for the cut or connection 406. The operator then instructs the machine to execute the repair 408. The tool then repairs the defect 410, and then advances to the next defect 412 and the process is repeated.

The operator may determine that the needed repair parameters and sequence instructions (or recipe) are the same as a previous recipe, and may choose to use stored recipes rather than creating a new one. Sometimes a single plate has numerous and different kinds of defects, and the operator prioritizes the order in which the repairs are made. For example, the operator may choose to first repair defects of a certain first type, followed by defects of a second type, and so forth. Or, the operator may choose to repair defects in a spatial sequence (for example, left to right, front end to back end of the panel).

Human judgment currently may be applied at most every step of the review/detection and repair of flat panels. Panel fabricators often seek both minimizing cost and optimizing time, and a repair tool operating automatically may be highly sought. However, as implied above, an automated tool must provide equal or better consistent judgment results at rates at least as quick as humans. The review and repair of panel defects offers several challenges that must be considered in the development of an automatic tool. First, detection, which typically relies on optical means, will produce images whose quality may vary within panels or over a series of panels in contrast, brightness, color, and other similar parameters. Such variations are brought into consideration by an operator during assessment of a potential defect image, and thus a means for automatic assessment will also need to be devised. The operator typically recognizes and identifies the defect type at approximately the same instant as determining whether or not a potential image is indeed a defect. However, due to variations in image quality, the operator may mistakenly identify the defect type or bin inconsistently or with ambiguity. Thus, an automated tool must address the challenge of binning defects accurately and consistently. A further challenge arises at the time of factory start-up, when the available classification data may be scarce or not accurate. An automated tool should therefore provide a means to build its own libraries of classification rules based on the accumulation of training examples and/or statistical data collected by the tool over time. Finally, once in full production, LCD panel fabricators will prefer repair tools that do not require full time attention by an operator.

In an article entitled "Automatic Repair in AMLCD" April 1994, Proc. SPIE Vol. 2174, p. 98-106, Advanced Flat Panel Display Technologies, Peter S. Friedman, Qiu et al recognized the need for automatic repair, and analyzed ways to enable automation. However, LCD panel technologies were relatively simple at the time and the decision-making rules within the architecture proposed by Qiu et al were based on a relatively small set of options. For example, only two defect types were recognized: "Open" or "Short", with four subclasses of "open" and three subclasses of "short." Further, three "open" repair functions were defined, while only a single "short" repair function was considered.

Since the publication of the above article, LCD panel fabrication has grown in complexity with the increase in use case for LCD panels ranging from computer laptop screens to computer monitors to television screens. For example, more material types and material combinations have been introduced; pixel designs now include a variety of sizes and shapes. In addition, panel fabricators wish to make repairs on a variety of layers. A need continues to exist for automating the array repair tool process steps to increase accuracy and to allow an operator to oversee more than one tool.

BRIEF SUMMARY OF THE INVENTION

In accordance with one embodiment of the present invention, a repair system for flat panel display (FPD) substrates performs a number of operations, such as automatic image capture and processing, automatic defect classification, automatic repair classification, and repair macro (instruction) generation software. The system is based on a flexible control architecture and includes associated graphical user interfaces (GUI).

Defect classification, repair classification, and repair macro generation are based on an open architecture and can address any number of use-cases through the use of multi-tiered classifiers, and thus a wide variety of panel designs may be repaired within a single repair tool. In particular, the method of the present invention includes recognition that automatic repair depends on defect classification, and that a multi-tiered set of classifiers, e.g., defect classifier, repair classifier, enables an efficient decision-making repair process with capability for customization.

The present invention is adapted to extend the rule-based classifier to include statistical learning (both online & batch) and active learning, in the context of a supporting database of defects and associated tools. Thus, the classifiers and recipe rules may be automatically or semi-automatically improved over time, incorporating lessons learned by operators while judging defect or repair needs. Accordingly, the defect repair system of the present invention is adapted to reduce the amount of operator time spent per tool, but also recognizes that there must be latitude in the tool operation for human intervention.

DETAILED DESCRIPTION OF THE INVENTION

Figure 1:
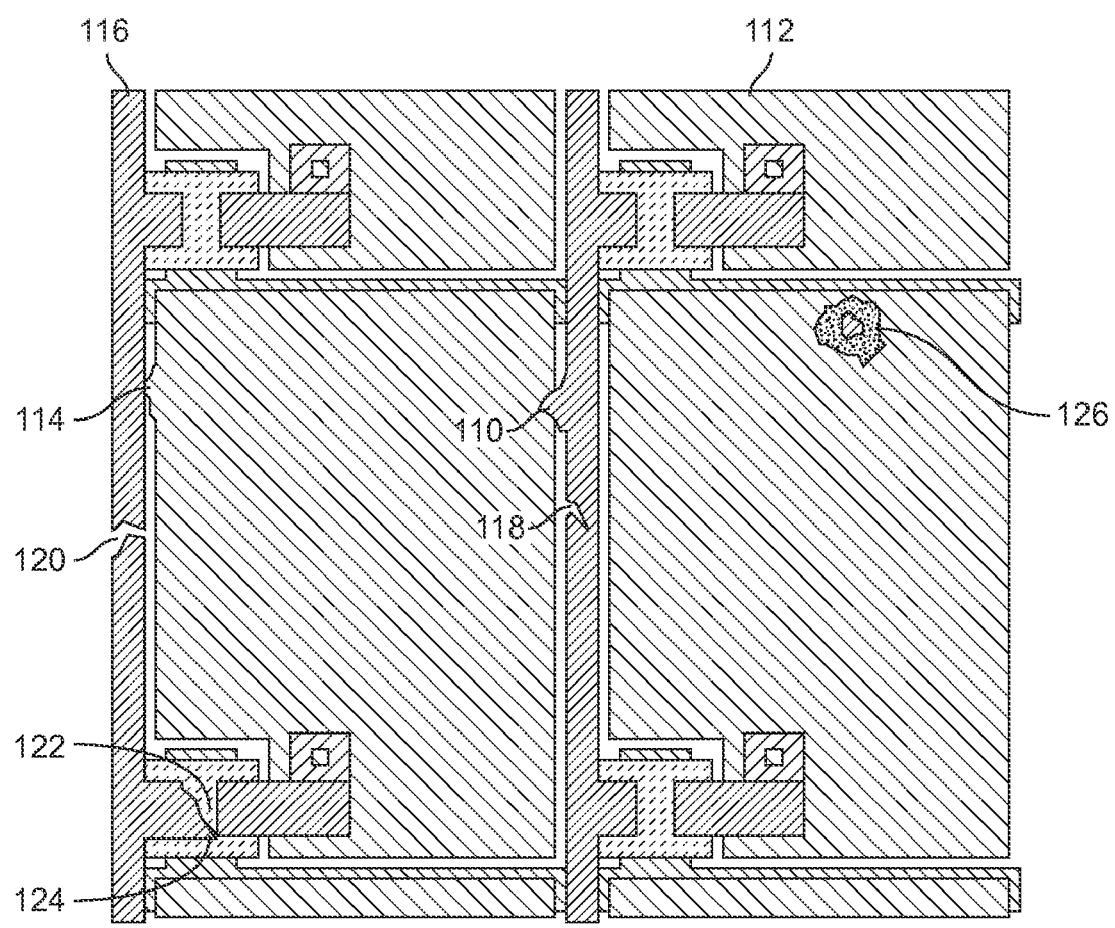
FIG. 1 shows a number of non-periodic defects in a top view of a portion of a large flat patterned medium with periodic transistor arrays.
Figure 2A:
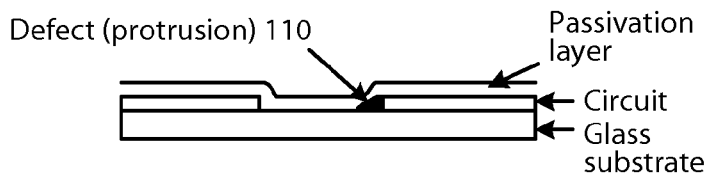
FIGS. 2A and 2B show cross sectional views of a device having a protrusion defect before and after repair.
Figure 2B:
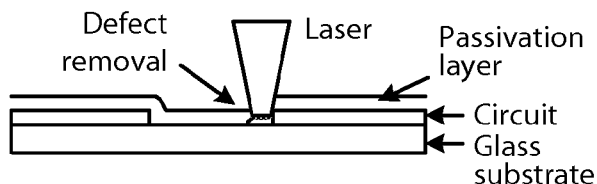
Figure 3A:
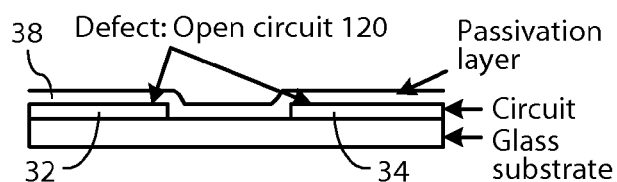
FIGS. 3A-3E show cross sectional views of a device having an open circuit defect before and after repair.
Figure 3B:
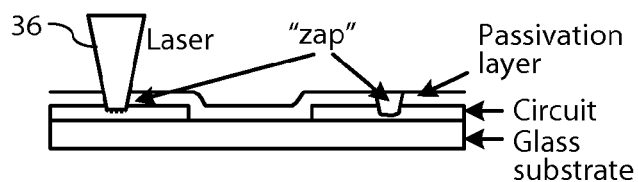
Figure 3C:
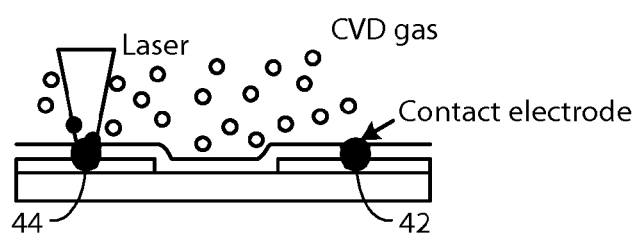
Figure 3D:
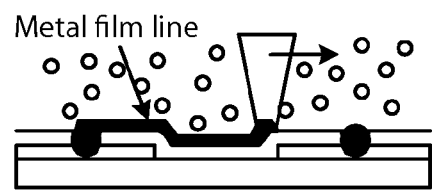
Figure 3E:
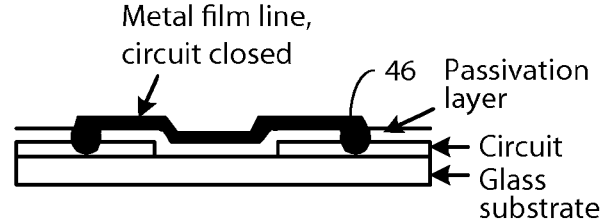
Figure 4:
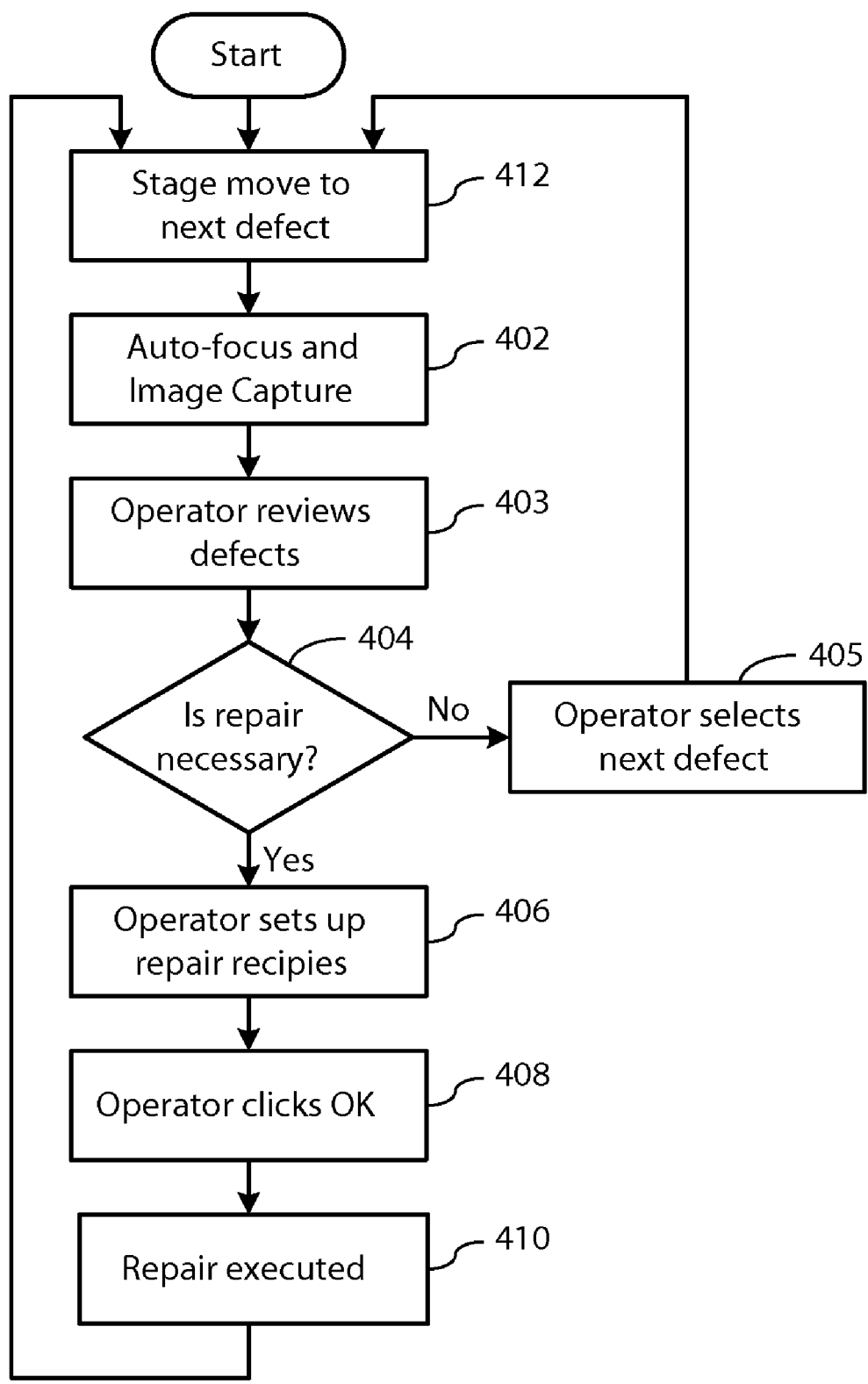
FIG. 4 is a flowchart of steps taken to repair defects, as known in the prior art.
Figure 5:
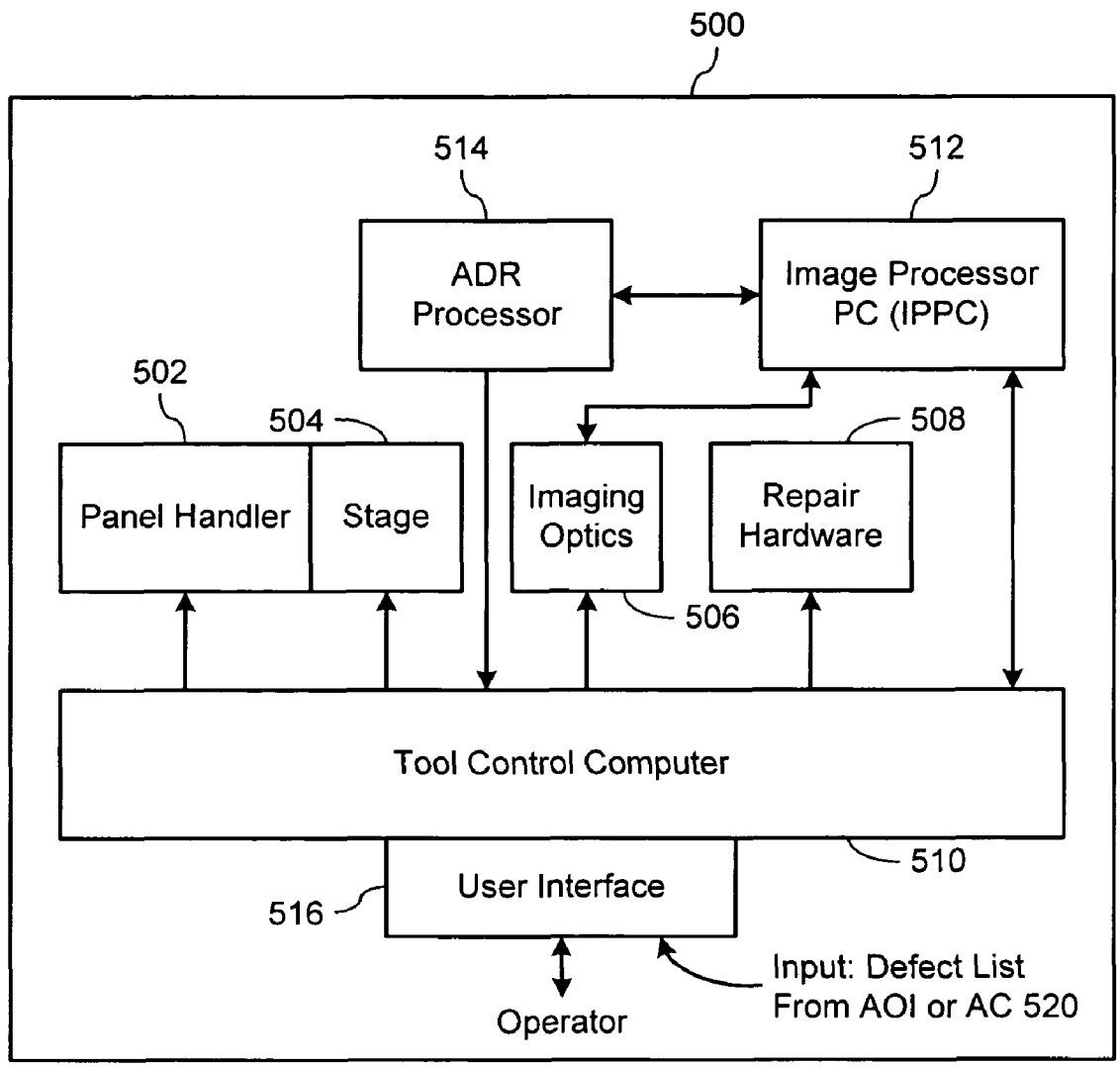
FIG. 5 is a functional block diagram of an array repair tool, in accordance with one exemplary embodiment of the present invention.

FIG. 5 is a functional block diagram of a LCD array repair tool 500, in accordance with one exemplary embodiment of the present invention. Exemplary array repair tool 500 is shown as including, in part, a panel handler 502, a stage 504 to move the sample LCD panel (not shown) into, within, and out of the tool; imaging optics 506 to capture images; repair hardware 508 to make defect repairs; a tool controller 510 adapted to control the hardware used to repair defects, an image processing computer 512 (IPPC) that processes the defect images, and an automatic defect repair (ADR) processor 514. Human operators control the tool through the graphical user interface 516 (GUI). In some embodiments, ADR processor 514 may be a part of or disposed in image processing computer 512. In yet other embodiments, ADR processor 514 may be a part of or disposed in embedded tool control computer 510. Furthermore, tool control computer 510 may be an embedded computer.

Imaging optics 506 typically includes a microscope of at least one magnification and camera hardware to capture images. Repair hardware 508 may include one or more lasers, associated optics, as well as material dispensing hardware, such as chemical vapor deposition (CVD) hardware, solid or liquid dispensing hardware, ink-jet or other directed material deposition systems.

Typically a defect list 520 acquired using an AOI or AC tool is entered into array repair tool 500 (alternatively referred to herein as repair tool or tool) by the operator or ported to the repair tool 500 automatically by a factory automation control system (not shown). The image of each defect is collected and passed by the imaging optics 506 to the IPPC 512, where the image information is combined with the defect's specific information acquired using the AOI or AC.

Figure 6:
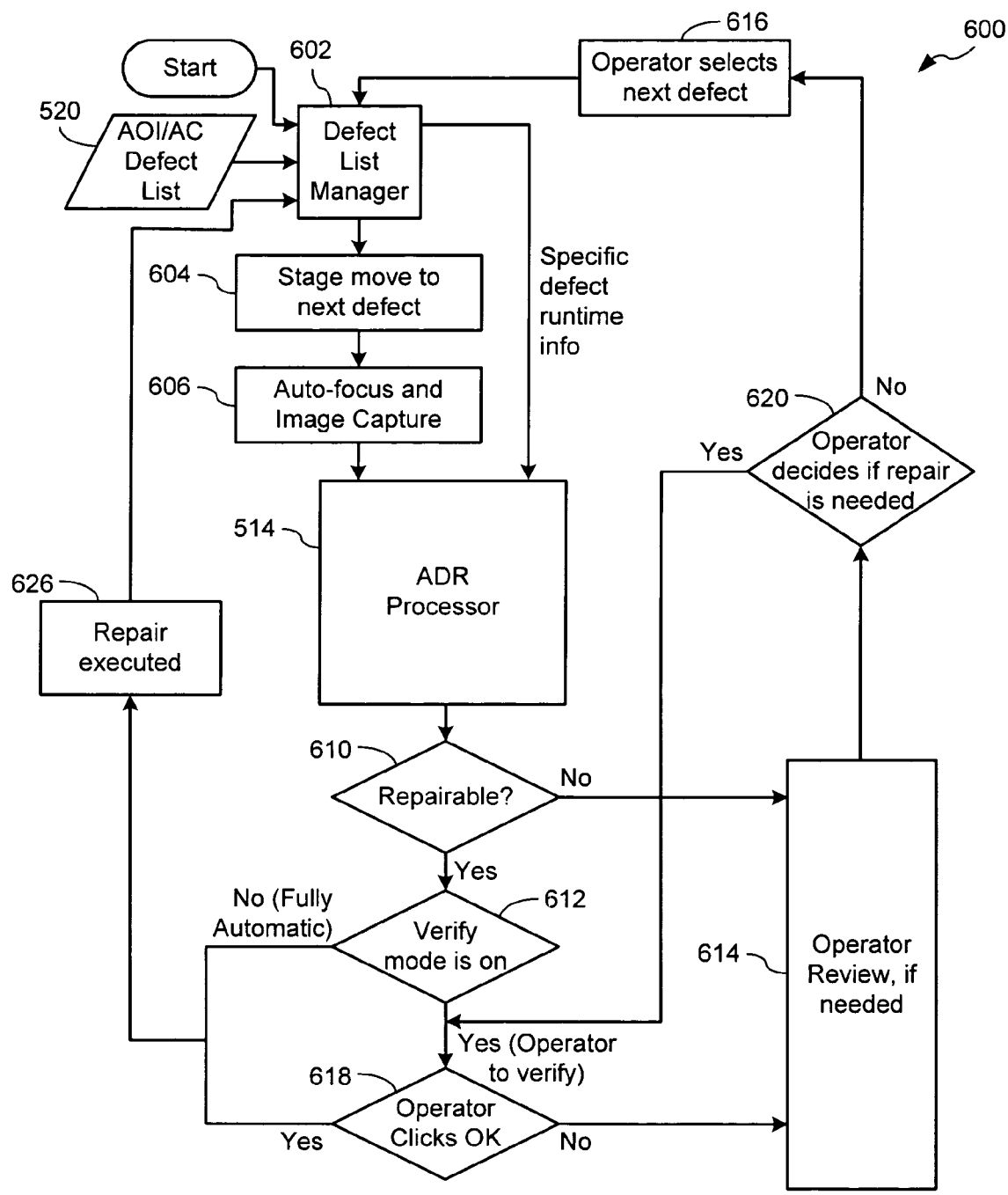
FIG. 6 is a flowchart of steps taken to repair defects, in accordance with one embodiment of the present invention.

FIG. 6 is a flowchart 600 of steps/processes carried out to repair defects, in accordance with one embodiment of the present invention. The defect list 520 acquired using an AOI/AC is supplied to a defect list manager 602 disposed in tool controller 510. Stage 504 moves the target LCD panel so as to bring the next defect into position 604 for defect re-detection and repair. Next, focus is acquired and an image of the defect is captured 606. ADR processor 514 processes the images captured during step 606 and using the specific defect run time information supplied by the defect list manager generates a repair macro (also referred to hereinbelow as recipe).

If it is determined that the target potential defect is repairable 610, and it is further determined that the verify mode is on 612 (i.e., tool 500 is in the semi-automatic mode), the operator is provided with the option of whether or not to proceed with the repair 618. If the operator selects to proceed with the repair 618, then tool controller 510 executes the repair recipe 626. Thereafter defect list manager causes stage 504 to move the target LCD panel so as to bring the next potential defect into position for review/repair. If the potential target defect is detected as being repairable 610 while in the fully automatic 612, then tool controller 510 executes the repair recipe 626. Thereafter, the next potential defect is brought into focus. The decision box labeled "Verify mode is on?" 612 enables human intervention (semi-automation) if "yes", or full automation if "no". For example, tool controller 510 may be instructed to process all defects that need no intervention, and bin (or set aside) those defects needing special attention. In this case, the tool controller processes as many defects as possible automatically, and then stops to allow the operator to review and set up the remainder. Setting the tool to run in this semi-automatic way permits the operator to supervise simultaneously several repair machines.

Figure 7:
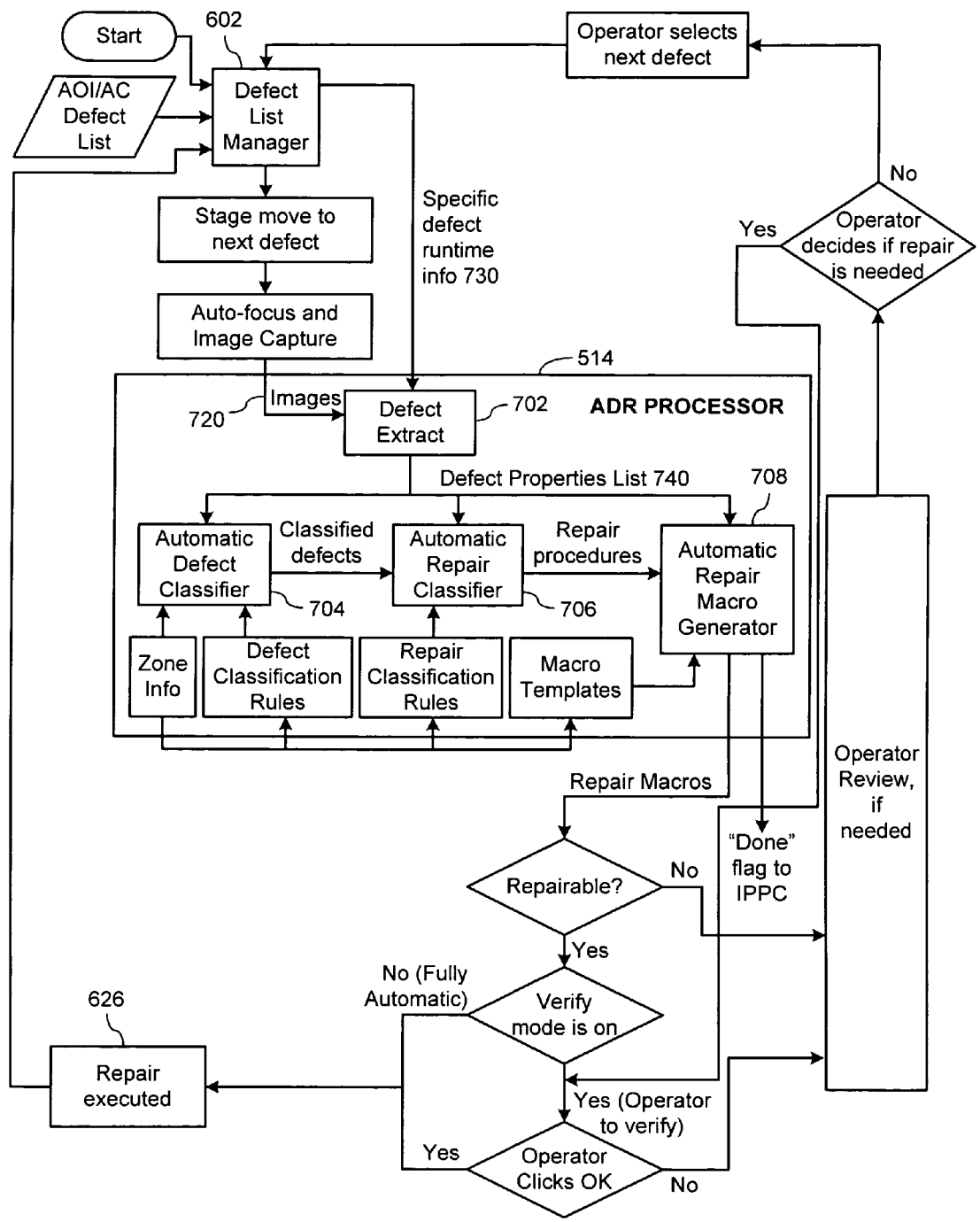
FIG. 7 is a block diagram of an automated defect repair processor of the array repair tool of FIG. 5 combined with the flowchart of FIG. 6.

If it is determined that the potential defect is not repairable 610, the operator reviews the potential defect 614. If the operator decides 620 that the potential defect requires repair and is a true defect, e.g., it is not a false positive, the operator then instructs the tool to move forward 618. If the operator decides 620 that the potential defect does not require repair, the operator selects 616 the next defect after which the defect list manager causes stage 504 to move the target LCD panel so as to bring the next potential defect into position for review/repair FIG. 7 illustrates the various functional blocks of the ADR processor 514. Exemplary embodiment 514 of the ADR processor, in accordance with one embodiment of the present invention, is shown as including, in part, a defect extractor 702, an automatic defect classifier (ADC) 704, an automatic repair classifier 706, and an automatic repair macro generator 708.

As seen in FIG. 7, defect extractor 702 receives and combines the captured image information 720 with the AOI/AC defect list 520 managed by the defect list manager 602 to generate a defect properties list 740, which is then sent to the ADC 704, the repair classifier 706, and the repair macro generator 708. ADC 704 is adapted to classify the defects using the defect properties list 740 and in accordance with established zone information and classification rules. Provided with the defect properties list 740 and the generated classified defects, the repair classifier 706 searches for and selects a repair classification rule associated with the specific defect classification, and creates procedures for the repair generator. Using the defect properties list and the generated repair procedures, repair macro generator 708 generates repair macros in accordance with a set of macro templates. Therefore, with defect location and image information, the ADR processor creates executable macros based on sets of defect classification rules, repair classification rules, and macro templates for the repair tools to execute repairs automatically.

Referring concurrently to FIGS. 5 and 7, ADR processor 514 sends the repair macro it generates to tool controller 510. To ensure that IPPC 512 remains synchronized with ADR processor 514 and tool controller 510, for the exemplary embodiment of FIG. 5, ADR processor 514 generates a "done" flag.

In one embodiment (not shown), at any point in the process, (not shown), the ADR processor may flag the operator for assistance. For example, the operator may need to intervene if the defect properties list for a specific defect does not have an associated classification rule. The operator can create a new classification rule, or choose to move on to the next defect. The operator may need to intervene if an associated repair classification rule cannot be found for the classified defect. Again, the operator can create a new repair rule, or choose to move on to the next defect.

As described above, in accordance with one aspect of the present invention, with defect location and image information, the ADR processor creates executable macros based on sets of defect classification rules, repair classification rules (alternatively referred to herein as repair rules), and macro templates for the tool to execute repairs automatically. Further, the present invention makes use of defect classification followed by repair classification thus providing a two-tiered classifier. Additional tiers of classifiers may be established. The use of multi-tiered classifiers sets up an architecture that is open and flexible for expansion to accommodate additional use cases and for adaptive learning. Multi-tiered classifiers enable an efficient decision-making process necessary for automation, reducing a set of potential defects to binned defects by type to associating repair rules to the defect type, and then generating a macro instruction for the tool to execute. The various blocks of the ADR processor of the present invention are described fully below.

Defect Detection and Extraction

Figure 8:
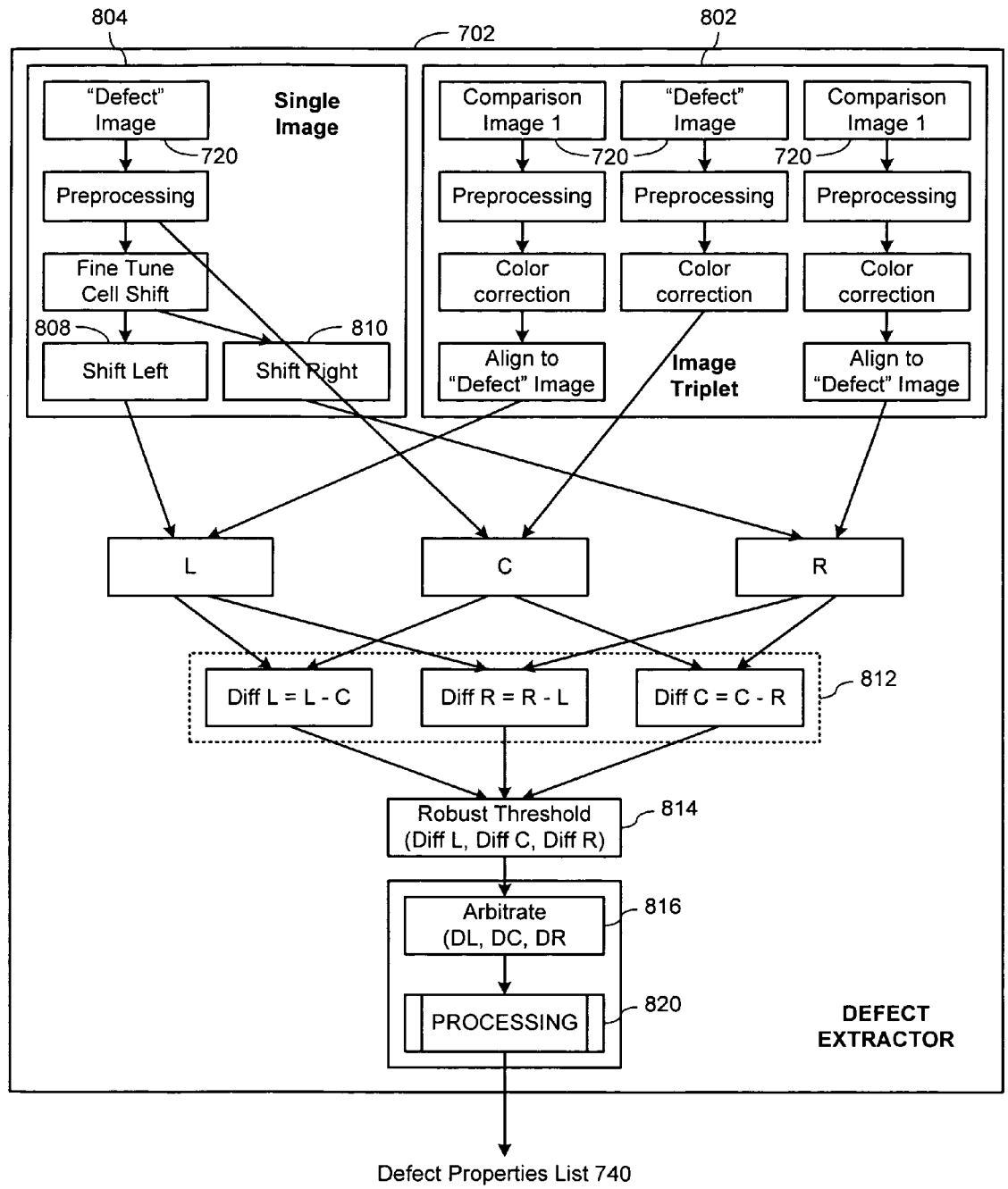
FIG. 8 shows various image processing and processing functions performed by the defect extractor, in accordance with one exemplary embodiment of the present invention.
Figure 9:
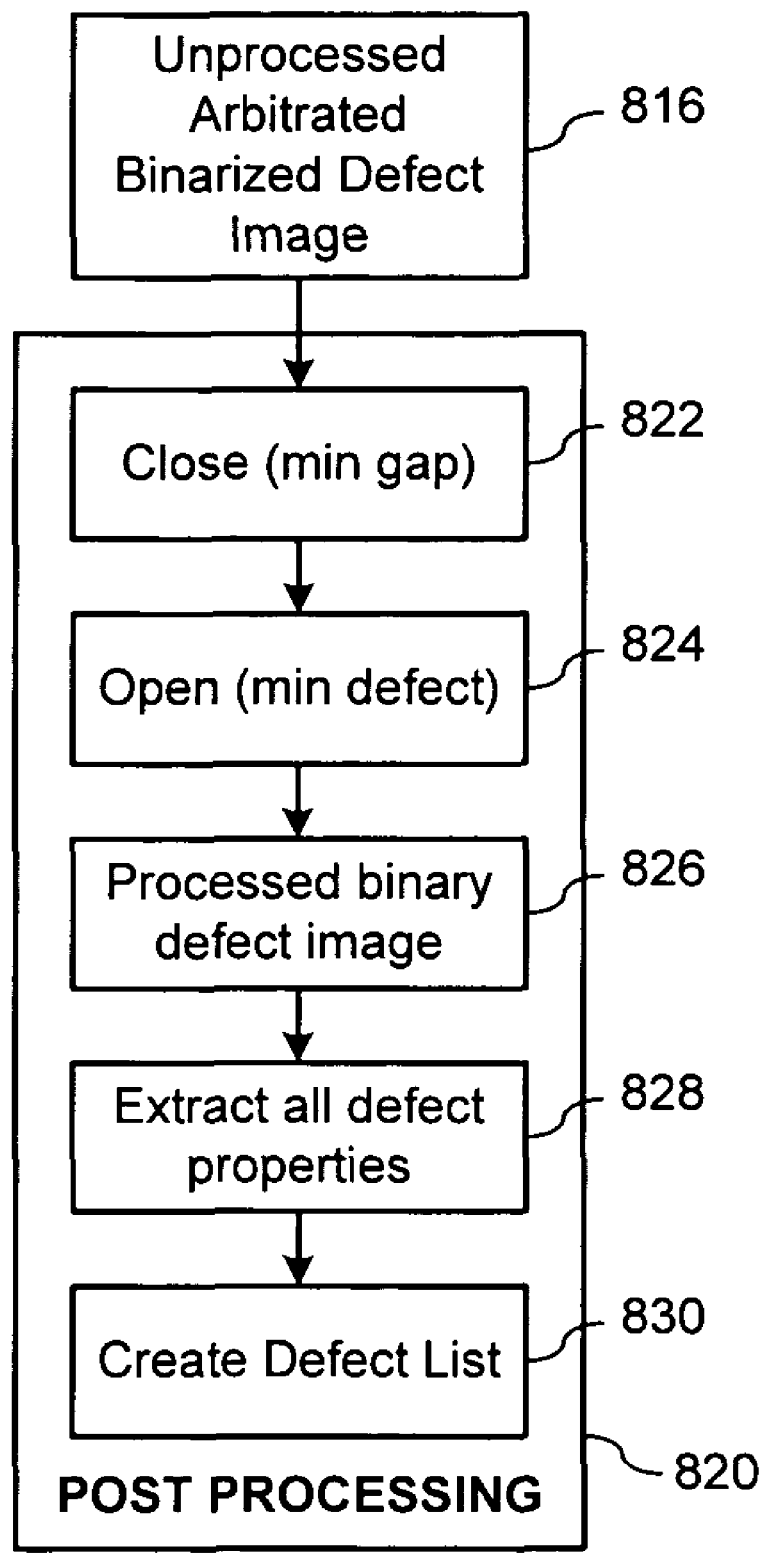
FIG. 9 shows various functions performed by the processing block of the defect extractor of FIG. 8, in accordance with one exemplary embodiment of the present invention.

ADR processor 514 is adapted to create a defect properties list from the image data acquired by the tool's imaging optics and the collected AOI/AC information 520. FIGS. 8 and 9 show the steps of defect extraction, namely pre-processing, difference computation, robust thresholding, arbitration, and post processing, required to create the defect properties list that is delivered to the defect classifier ADC 704, repair classifier 706, and repair macro generator 708.

One well know method for defect detection is comparing the suspected defective pixel with its neighbors, either by comparing multiple cell-aligned images or by comparing cells within the same image. Algorithmically the comparison is accomplished by "shifting and subtracting" the multiple images, or subimages, either vertically or horizontally. FIG. 8 shows two cases: (i) multiple cell-aligned images (triplet) 802 are collected and processed, and (ii) cells of the same image 804 are compared (single image). Because flat panel structures are repetitive, if a single image has at least three cells present, it can be processed by the defect extractor by shifting one cell in each direction. If there are not three cells present, then three images need to be taken (triplet), with the left and right images acquired one (or N integer) cells away. It is possible to use more than three images for detection. However, three is the minimum necessary to use arbitration to eliminate false defects and to determine which cell is defective.

As shown in FIG. 8, for the single image case 804, the defect image is shifted left 808 and right 810, and then differences from the original are computed (DiffL, DiffR, and DiffC) 812. The image or image triplet may first be preprocessed by algorithmic smoothing and/or other means to enhance signal. For the triplet case 802, since each image is taken from three different spots at three different times, they may have different imaging conditions. Different imaging conditions may give rise to differences in color. Thus, for the triplet case, it may therefore be necessary to perform color correction before computing differences, since color differences may yield false results in the difference computation for defects.

An important aspect about defect detection is being able to automatically detect the real defects while detecting few or no false (nuisance) defects. In any real system it is impossible to have absolutely perfect defect detection and no false defects. This system minimizes the false defects by allowing an arbitrary number of images to be compared. To further reduce false defects, the difference images are then thresholded 814 using robust statistical methods and then arbitrated 816, that is, only defects found in two adjacent difference images are considered true defects.

The arbitrated binarized image 816 are delivered to processing block 820. FIG. 9 shows various functions performed by the processing block 820, in accordance with one embodiment of the present invention. Nearby potential defects are merged together ("Close") 822, and then defects smaller than a specified size are eliminated 824. The result is a processed binary defect image 826. Finally defect properties for each defect within the binary defect image are extracted 828, resulting in a defect properties list 830. An example of a defect properties list is shown below. It contains defect related information, including for example, color information.

| | |
|---|---|
| Area: | 49 |
| Centroid: | [308 225] |
| BoundingBox: | [304.5000 221.5000 7 7] |
| SubarrayIdx: | {1 × 2 cell} |
| MajorAxisLength: | 8.0829 |
| MinorAxisLength: | 8.0829 |
| Eccentricity: | 0 |
| Orientation: | 0 |
| ConvexHull: | [9 × 2 double] |
| ConvexImage: | [7 × 7 logical] |
| ConvexArea: | 49 |
| Image: | [7 × 7 logical] |
| FilledImage: | [7 × 7 logical] |
| FilledArea: | 49 |
| EulerNumber: | 1 |
| Extrema: | [8 × 2 double] |
| EquivDiameter: | 7.8987 |
| Solidity: | 1 |
| Extent: | 1 |
| PixelList: | [49 × 2 double] |
| Perimeter: | 24 |
| PixelLoc: | 0 |
| ColorImage: | [7 × 7 × 3 uint8] |
| ColorInfo: | [100 233 60] |

Figure 10:
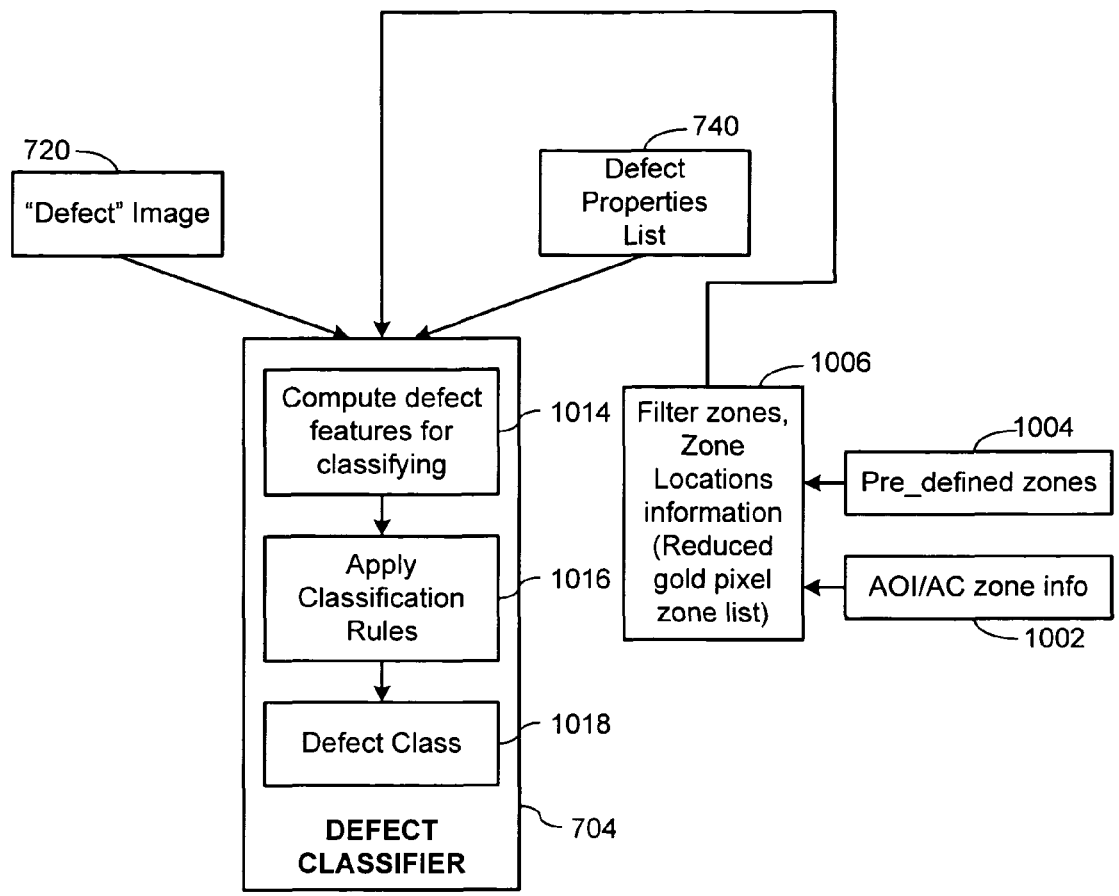
FIG. 10 shows various functional blocks of the defect classifier, in accordance with one exemplary embodiment of the present invention.

FIG. 10 shows various functional blocks of automatic defect classifier 704 which requires location (or area or zone) information for the defect. The defect list 520 (FIG. 6) includes data from electrical testing (such as Photon Dynamic's™ Array Checker) or AOI (Automatic Optical Inspection) machines. Such defect data typically contains the defect size and the approximate location of the defect, but may only contain the row and column in the LCD panel of the suspected defective pixel. The exact location of the defective pixel provided by the AOI or AC may be off by a pixel or two. However, accurate and robust defect detection over a neighborhood of pixels surrounding the suspected pixel is essential for correct defect detection, classification and repair.

In accordance with the present invention, defect locations are accurately determined and supplied to each of defect extractor 702, defect classifier 704, repair classifier 706, and repair macro generator 708. In particular, it is important to know what zone (portion) of the pixel the defect is located since this can influence what the subsequent repair definition may be. For example, if the defect is found in the TFT (transistor) zone of the pixel, then there is a high probability that the transistor is bad. Then the appropriate repair rule is the "Kill Pixel" repair, as will be illustrated in another section below.

To help the user to easily and accurately enter the zoning details, a graphical user interface, such as a zone editor, may be employed. In one embodiment, as part of overall tool set up operations, the user draws the outline of the zones with a polygon-drawing tool onto an image of a so called Gold Pixel. This image is used for the zoning as well as in the Macro Template Editor discussed later. The user may select from predefined zones 1004 (FIG. 10), such as TFT, DATA, GATE, ITO, CHANNEL, VIA, COMMON, or the user may create new zones with their own unique labels, based upon the unique design and structure of different LCD pixel layouts.

As shown in FIG. 10, zone information 1002 of the defective pixels as provided by the AOI/AC may be combined with the pre-defined zones 1004 and filtered 1006 to reduce the pre-defined zone list to viable zone candidates for the particular defect of interest. This reduced list of gold pixel zone locations 1006 is then provided to defect classification rules, the repair classification rules, and the repair macro templates, as illustrated in FIG. 7.

Automatic Defect Classifier

FIG. 10 shows, in part, an exemplary embodiment of the defect classifier 704 of the present invention. Defect classifier 704 receives defect image information 720, zone location information 1006, and the defect properties list 740, and computes the defect features 1014 needed for classification. Applying the classification rules 1016, also shown in FIG. 7, defect classifier 704 seeks all matches for the defect under review. Thereafter, defect classifier 704 creates a definition of the classified defects specifying the defect class 1018, and passes this information to repair classifier 706.

The defect features list computed at step 1014 within the defect classifier 704 is developed from the inputs it receives. One action within computational step 1014 is to spatially transform the reduced set of gold pixel zones and then overlay them onto the acquired defect image. Defect detection is performed and the defects are matched with the zones to determine which (if any) zone and defect is touching or nearly touching. Because the present invention uses a series of classifiers whose rules may be adjusted, other metrics for zoneness may easily be added. For example, rules that specify distance relative to a zone may be defined, such as "defect completely within zone" or defect within 5 microns.

As described above, defect classifier 704 is adapted to receive defect properties list 740 and the zone location information 1006 and combines them so as to generate a list of features 1014 for a specific defect. An example of such a list is shown below:

```
F DefectId = 6
F Area = 49
F Brightness = 200
F Contrast = 0.5
F Color = 100, 233, 60
F Size = 0.96
F PixelLoc = 0
F DefectType = None
F GateZone = 1.00
F DataZone = 0.00
F ItoZone = 0.00
F TftZone = 0.00
F ChannelZone = 0.00
```

Defect classifier 704 is further adapted to generate new logical variables, referred to hereinafter as derived features. Examples of such derived features are shown below:

```
Tiny:= Area <= 2.5
Dark:= Contrast < -0.4
Xstor:= ChannelZone==0.0 || TftZone==0.0
```

For example, derived feature Tiny indicates that the defect is not large enough to be a likely cause of an electrical defect in the pixel. The derived features can further facilitate and simplify the rules used by the defect classifier.

Classification rules guide the assignment of a defect into a defect-type classification. Three examples of classification rules are illustrated below.

```
ActiveResidue: ItoZone ==0.0 && !Dark && Area > 10.0
Channel: DefectType == Pixel && ChannelZone==0.0 && !Tiny
GdShort: DefectType == Gds && Xstor
```

The left-hand side of the colon represents the defect-type, and the right-hand side of the colon represents the rule which is based upon a small set of features and prepositions. For example, the defect represented by the feature list above satisfies the Active Residue rule, because the IToZone is true, the derived feature Dark is not true, and the Area feature is greater than the rule's requirement of 10.0. In other words, all conditions for Active Residue are true. The example of the Channel rule also includes a derived feature, tiny, along with features DefectType==Pixel and Channel Zone==0.0 defined in the defect feature list above. Thus, Channel rule's conditions are not met. These examples show how decision-making may be executed by a repair classifier 706.

The use of a rule-based classifier for defect classification enables improvements and enhancements to the classifier rule set over time. For example, at factory start-up, there likely will be few training examples or statistical data available for the classifier. These must be learned or developed and added to the classification rules as factory production matures. The present invention allows the addition of new or adjusted classification rules devised by the operator as shown in FIG. 7.

Automatic Repair Classifier

Figure 11:
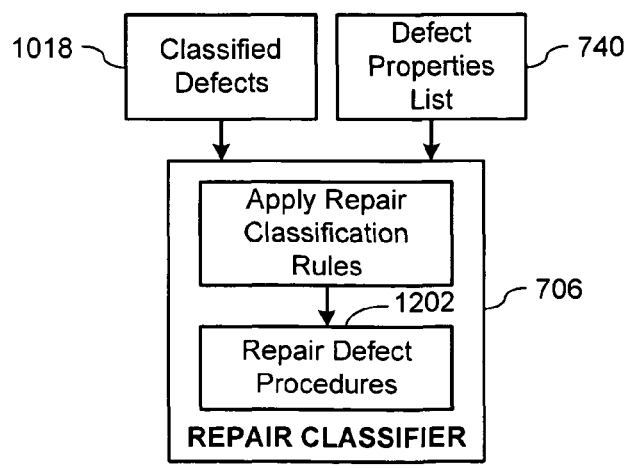
FIG. 11 shows various functional blocks of the repair classifier, in accordance with one exemplary embodiment of the present invention.

As shown in FIGS. 7 and 11, the classified defects 1018 and the defect properties list 740 are sent to the automatic repair classifier 706 which generates repair procedures 1202 using a set of repair classification rules. In accordance with the present invention, a second set of rules, namely repair classification rules, is used to determine the necessary repair action. A few examples of repair classification rules are shown below:

```
ChopData: GdShort && Xstor
KillPixel: ChopData || Channel
IsolateDataCommon: ActiveResidue
```

The left side of the colon is the repair identifier and the right side is the defect classification and/or item from the defect features or derived features list described above. For example, the ChopData repair classification rule shall be invoked if GdShort && Xstor conditions are true. The IsolateDataCommon repair classification rule shall be invoked if the defect class ActiveResidue conditions are true.

As is the case for the defect classification rules, the set of repair classification rules may also be increased or improved. For example, one type of improvement for repair classification rules is repair accuracy, which should exceed and is more important than the defect-class accuracy. Text-based defect classification rules are used to determine the repair action in the case of normal defects, but more sophisticated machine learning techniques for anomalous or boundary-case defects may be employed. The defect classification rules and/or repair classification rules may be manually or automatically updated.

Automatic Repair Macro Generator

The data that have been provided by the AOI or AC tool and the defect image data from the repair tool itself at this point in the flow have been condensed to a set of repair procedures for the particular defect of interest which are supplied to automatic repair macro generator 708.

For each defect repair there is one macro template. This relationship is typically maintained in a file or in memory at run-time to improve performance. In the examples below, the left side is the repair classification procedure and the right side is the repair macro template file:

| IsolateDataCommon | CutDCMacro.tpl |
| ChopData | CutDLMacro.tpl |
| KillPixel | CutTFT01Macro.tpl |

Figure 12:
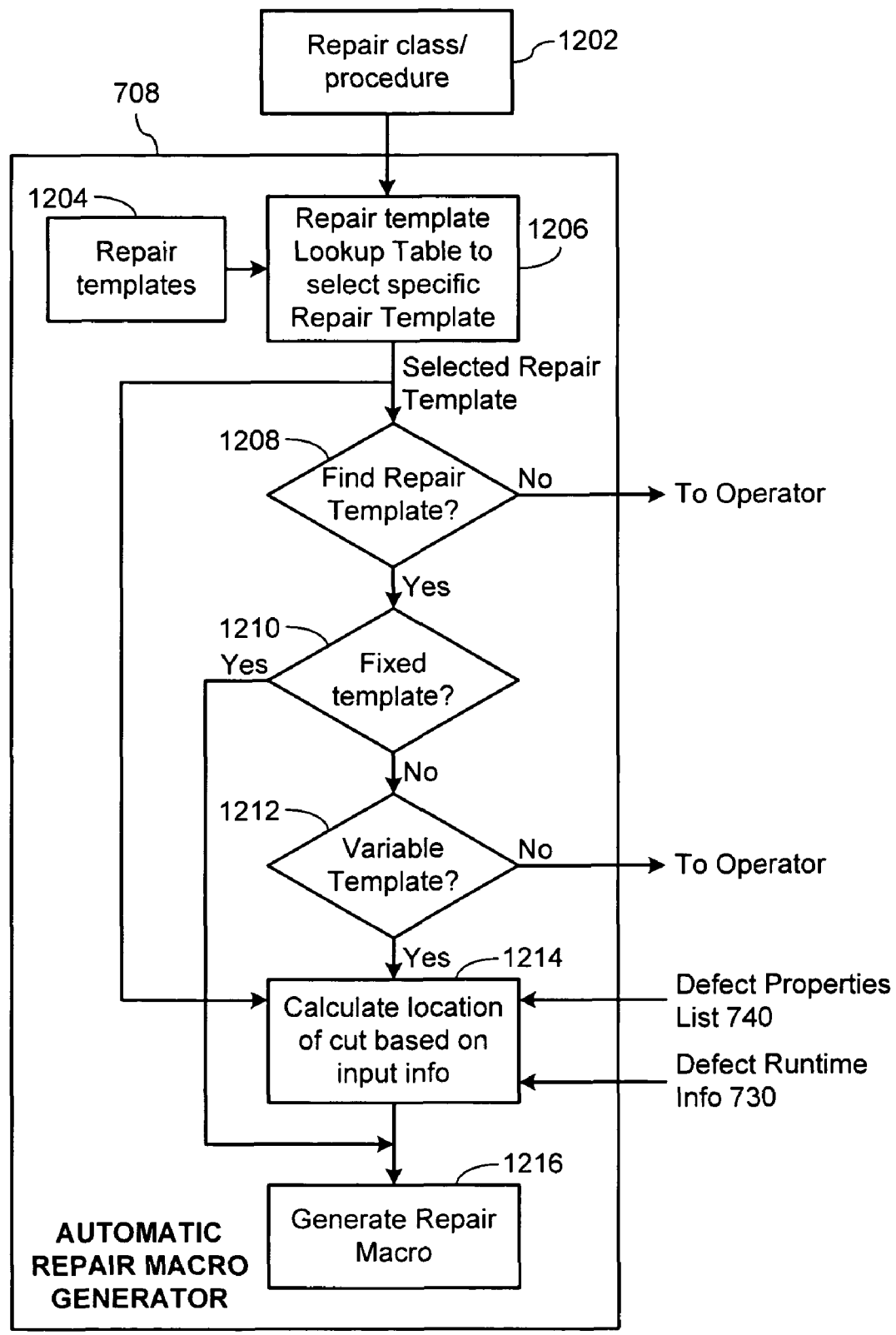
FIG. 12 is a flowchart of steps carried out by a repair macro generator, in accordance with one exemplary embodiment of the present invention.

FIG. 12 shows the various functional steps performed by repair macro generator 708, in accordance with one embodiment of the present invention. Repair class 1202 and repair template 1204 are used as entries in a repair template lookup table to select the repair template 1206 that supports the repair class/procedure for the defect of interest. If no repair template is found 1208, the tool may ask the operator to intervene 1208. If a repair template is found 1208, the next step in the macro generator is to determine the template type. Any type of macro template is supported, although in the following description only fixed and variable macro templates are described. A fixed template is independent of defect location or size or other characteristics. For example, the KillPixel macro template, described above, is a fixed template. It requires that the "CutTFT01" macro be executed. The "CutTFT01" file has the following lines:

| ZoneDefinitionFile: GoldZoneDefinitions.zdf |
| LaserRecipeFile: atp.rcp |
| LaserConfigFile: laser.cfg |
| Fixed Line CutTFT01 50X-IR 1014 188 1024 199 |

This file instructs the tool to disable the transistor (TFT) of the LCD pixel by performing a laser cut at the fixed location specified by the template, independent of the defect location. The laser parameters are defined by the second and third lines, where the right side of the colon are laser recipe and files saved in the tool controller 510. The last line specifies the optical macro template type, "variable", type of laser cut, selection of lens (50× magnification and IR laser) and location of cut (1014, 188, 1024, 199).

If the resulting repair template is a fixed template 1210, then the repair macro is generated 1216. If the resulting repair template is not a fixed template, then in this exemplary embodiment it is considered as a variable template 1212. A variable template is defined as one in which the size and location of, for example, a cut, or other repairs must be defined by the pixel zones and the specific defect's size and location. Thus, the defect size and location must be supplied to the template. As shown in FIG. 12, the selected repair template 1206 is combined with the defect properties list 520 and any additional defect runtime information 730 so that the specific defect information may be updated 1214. Thereafter the repair macro is generated 1216. For example, the IsolateDataCommon repair template is a variable template and its CutDC file has the following steps.

| ZoneDefinitionFile: GoldZoneDefinitions.zdf |
| LaserRecipeFile: atp.rcp |
| LaserConfigFile: laser.cfg |
| Variable Line CutDC 50X-IR 1011 97 182 92 |
| Variable Line CutDC 50X-IR 208 58 1049 59 |

In this case, the CutDC, or Cut Data Common template file performs a cut between the data and common zones of the pixel, as specifically detailed by the defect's size and location information. In this file as in the fixed template case, the second and third lines define the macro's laser recipe and setup files. In this variable file, the last two lines describe the variable templates themselves and location information. A safety margin is typically added to the length of the cut to insure that data line and common are electrically isolated.

The final function in the ADR processor is to translate the macro template and repair instructions into the specific macro and recipe for the tool to execute. The LCD panel repairs are typically done by a multi-beam laser system. The laser is instructed to perform a list of simple commands, called repair macros of the form:

| <LaserCutType>.<RecipeName>.rpixel.<Mag&Lens>{<StartLoc>;<EndPoint>;} |

The first field is the type of laser cut: Line, Block, etc. The second field is typically the laser recipe name, but can also be simple instructions to the operator, such as "Operator" which means that the defect can not be repaired automatically and requires human intervention. CVD on the other hand, instructs that this defect be sent to a chemical vapor deposition system for repair. The third field is the repair method, in this case a "repair pixel". The fourth field is the lens magnification and wavelength of the laser. In these examples the IR (infrared) laser is selected with a 50× lens. The fifth field, enclosed in curly braces, is beginning and end points of the laser cut. To continue with the examples above, the Kill Pixel macro may be generated from the above template and appear as shown below:

| Point.CutTFT01.rpixel.50X-IR{200.2,20.0;202.7,4.7;} |
| Point.CutTFT01.rpixel.50X-IR{210.2,20.0;212.7,4.7;} |
| Line.CutTFT01.rpixel.50X-IR{-360.6,1.8;-324.452,5.373;} |

The generated "Cut Data Common" macro may look like the following:

| Line.CutDC.rpixel.50X-IR{-360.309,1.834;-224.452,5.373;} |

These repair macros constructed from macro templates are identical in form and function as ones created by a repair operator. A macro template editor for generating the macro template files may help the user easily create and modify the macro templates through a graphical user interface.

Figure 13:
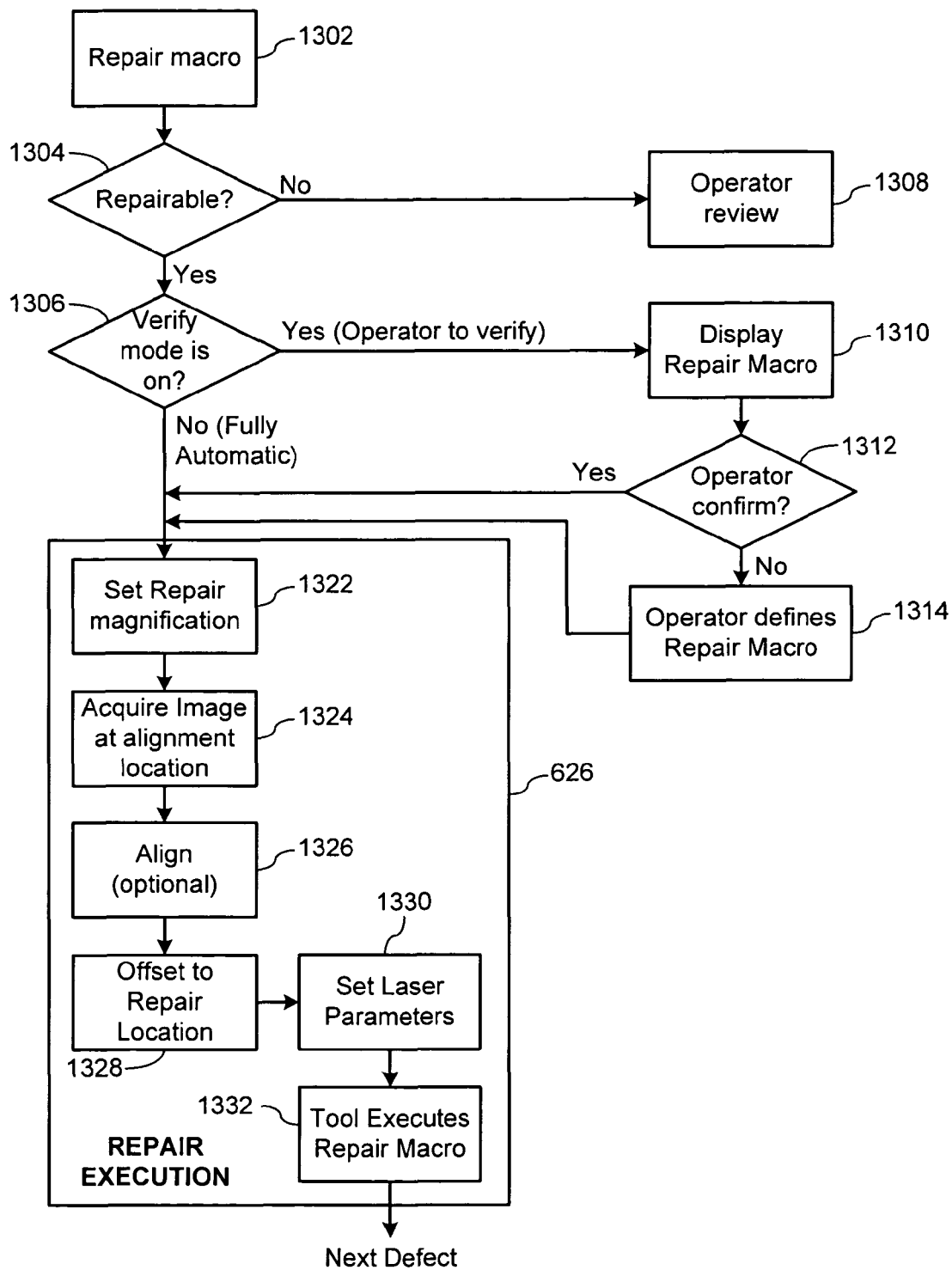
FIG. 13 is a flowchart showing various steps associated with repair execution, in accordance with one exemplary embodiment of the present invention.

As shown in FIGS. 7 and 13, once the repair macro is retrieved 1302 and the defect is detected as being repairable 1304, if verify mode is on, the repair macro is displayed to the operator 1310. If the macro's cut locations or other key data are satisfactory, the operator can accept the macro for execution 1312. The macro at this point has all the information required for repairing the selected defect, namely defect and repair information based on two classifiers, specific spatial information, and specific repair information, e.g., laser power, spot size, etc. This final macro is then returned to tool controller 510 to begin execution of the repair. If the macro is not deemed satisfactory, the operator may tune it as necessary 1314 before proceeding with the completion of the final set up parameters and execution of the repair.

Repair executions are carried out by tool controller 510. Repair magnifications are established 1322, images at alignment locations are acquired 1324, alignment is performed if required 1326, offsets to repair locations are invoked 1328, the lasers parameters are adjusted 1330, and finally the repair is executed by tool controller 510. The alignment step may not be necessary if the stage has not been moved.

Figure 14:
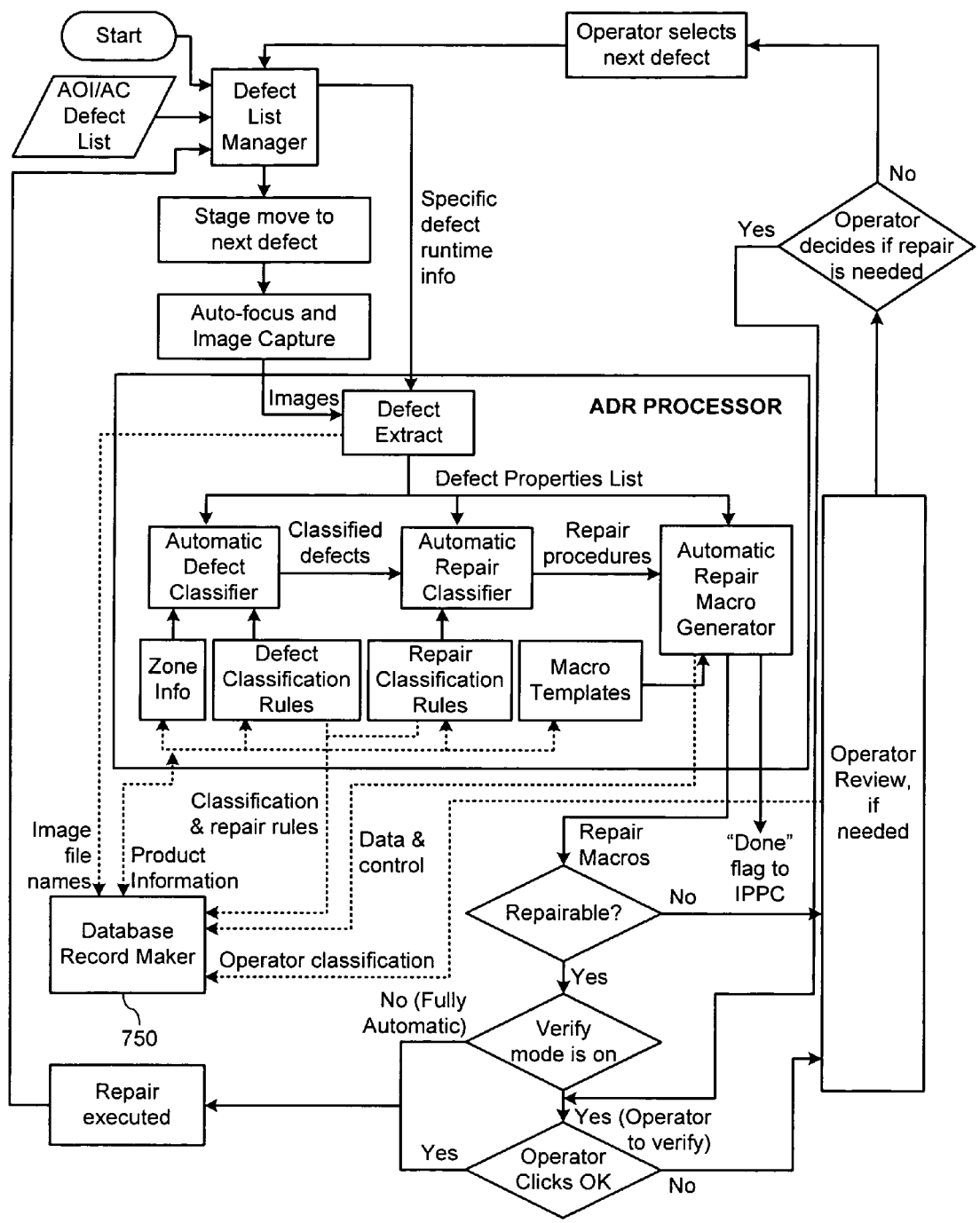
FIG. 14 is a block diagram of an automatic defect repair sequence including a data base repository in accordance with one exemplary embodiment of the present invention.

FIG. 14 is similar to FIG. 7 except that FIG. 14 is also shown as including a database record maker 750 configured to store defect instances. Several types of information are stored in the database, including image file names received from defect extractor 702, defect classification rules and repair classification rules from the defect classifier and repair classifier, data and control information from the repair macro generator, and classification and repair information generated manually by the operator. The database record maker may act as a repository for new or amended rules, and either automatic or manual updates of the classification rules may occur. However, it is understood as described above, that the rule-based classifier allows for automation without the requirement of a database.

The defect instances stored in the database record maker also allow offline (batch-mode) statistical learning to occur, and may also play a role in online learning. Those skilled in the art understand that the present invention by using a mixture of classifiers (including some windowing & instance-based reasoning) enables a smooth transition from the start-up phase of a tool in a fab when hand-written rules are often used, to the production phase and machine-learned rules. Further, the database and classifier methods allow adaptation to changes in process defects, including radical changes in relative populations and concept drift. Other components could be added to the system, without affecting its basic structure: such as, anomaly detector, SPC alarm, and stacked defect view.

Figure 17:
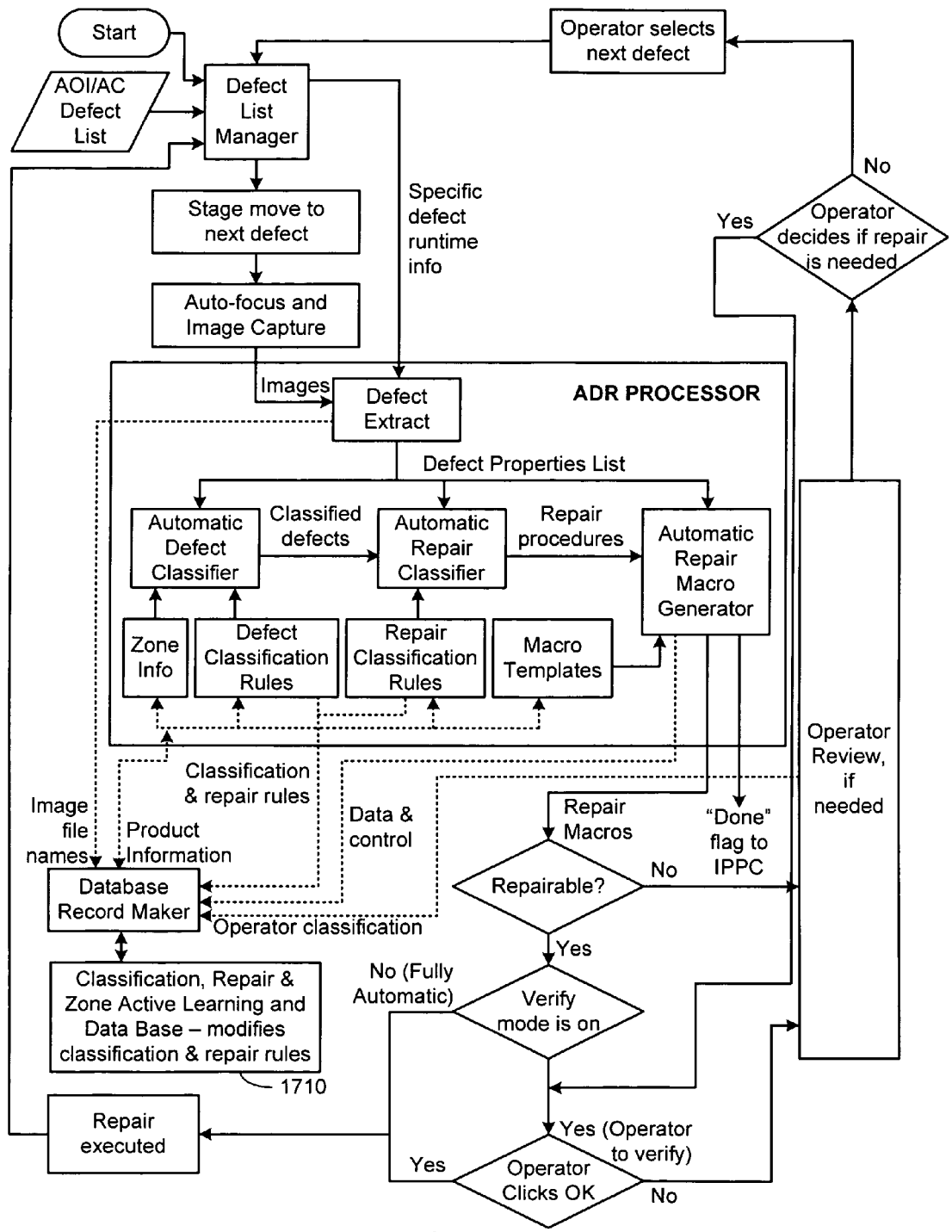
FIG. 17 is a block diagram of an automatic defect repair sequence with active learning, in accordance with one exemplary embodiment of the present invention.

FIG. 17 shows how the automated defect repair system of the present invention accommodates adaptive learning. Step 1710 allows the updating of the two classifiers (defect classifier and repair classifier) and pre-defined zone info and macro templates. Adaptive or active learning may take several forms, for example, (i) selecting which image sample to save in the database; (ii) adding to the list of defects deferred to the operator, so as to expand or confirm the set of expert-labeled training examples, or (iii) confronting the operator with a stored image, to test for consistency of human judgment, especially in cases where ADC detects a contradiction.

Figure 15:
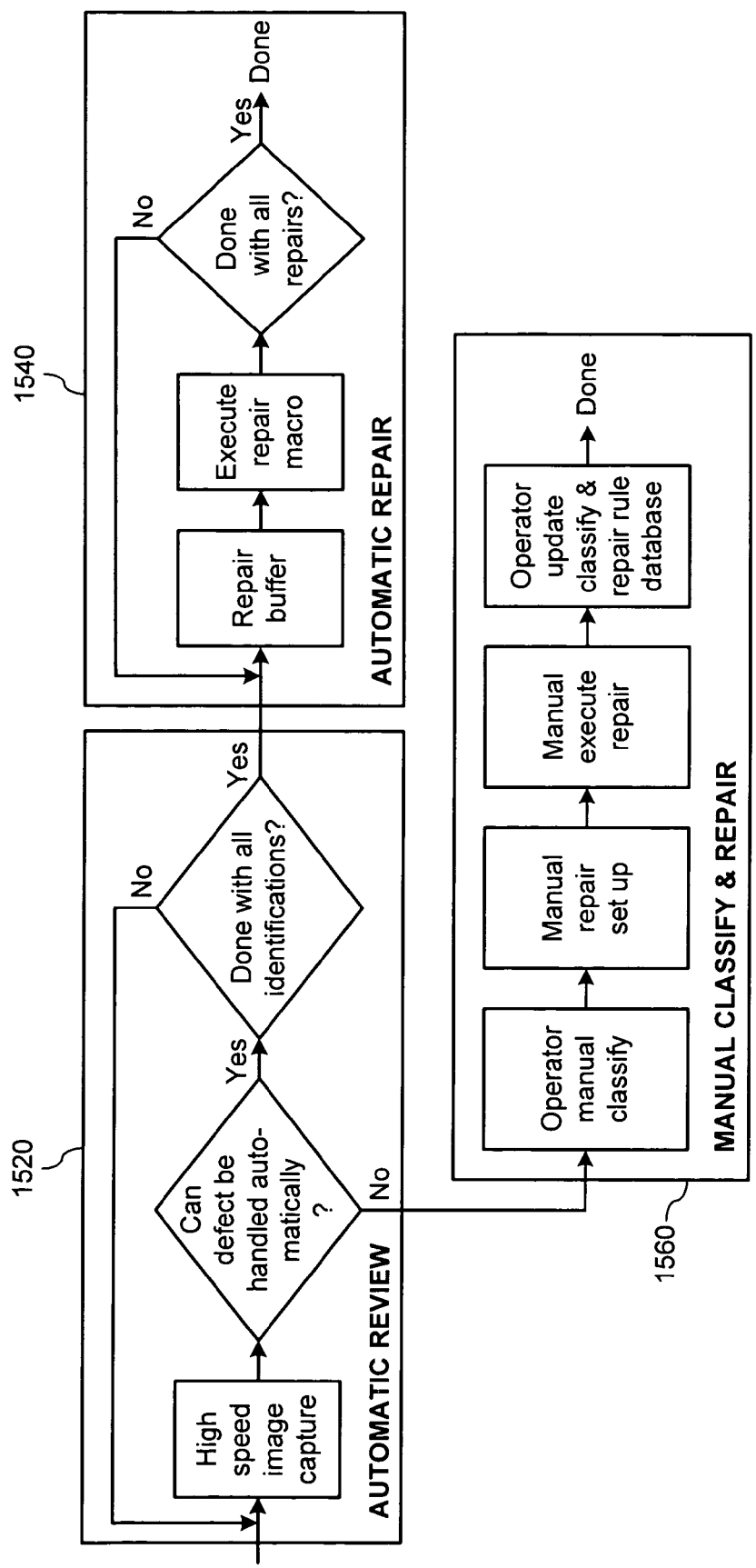
FIG. 15 shows a process in which all defects are first reviewed and then those to be repaired are completed all at once, in accordance with one exemplary embodiment of the present invention.

FIGS. 6 through 14 describe a system and method where defects are judged and repaired one at a time and sequentially. The present invention also provides an alternative sequence for automatically repairing defects, as shown in FIG. 15, in accordance with which all defects are first reviewed, and then all required repairs are performed. FIG. 15 shows that the processes can be divided into automatic review 1520, automatic repair 1540, and manual classify and repair 1560.

During the review process not all defects are necessarily classified automatically. Those that require special attention are thus filtered out to manual classify & repair functional block 1560. Hence, the sequence in FIG. 15 illustrates a hierarchal approach for tool usage, namely all defects that can be processed automatically proceed forward 1520, while those that require attention are set aside or binned for the operator to classify and set up repair recipes at a later time 1560. At production start up, the percentage of defects that are manually processed may be higher compared to those automatically repaired. However, as the classifier and repair rule database grows with production maturity, the percentage of defects processed automatically should dominate over the percentage of defects needing to be processed by an operator.

Further, even at a mature production facility, the hierarchal sequence shown in FIG. 15 may help optimize the time spent by the operator at the tool, since operator judgment may be most critical at the defect review step. Once the identification of which defects are to be repaired is completed, then the operator instructs the tool to execute repairs automatically and the operator can be free to attend to other matters. Further, this alternative sequence of reviewing all defects followed by repairing all allows, for example, one array repair tool to be used exclusively for defect review and another tool to be used exclusively for repair. Some repairs may need to be completed on a specialized machine, such as CVD. The present invention thus allows for the use case of a mixture of machines, e.g., the review function performed by one tool type, while the repair function is performed by another tool type or by a second tool of the first type.

The review/repair tool must effectively detect and locate defects flagged by an AOI or a tester AC tool, where this repeat of detection is also known as re-detection. Re-detection by the repair tool further requires defect classification and more accurate location information. Such information may be useful to the AOI or AC tools that originally flagged the defects, which may have their own means for defect classification.

Figure 16:
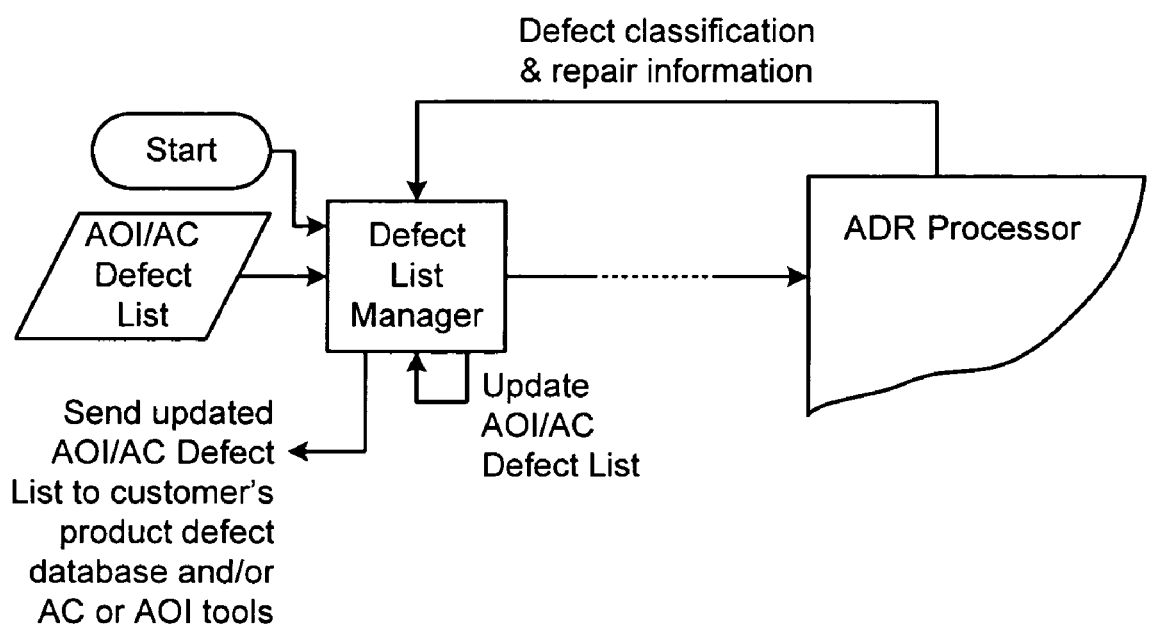
FIG. 16 shows a schematic in which the defect classifier returns updated AOI/AC defect list information to the defect list manager, in accordance with one exemplary embodiment of the present invention.

Referring to FIGS. 16 and 6, in accordance with some embodiments, ADR processor 514 is configured to provide information to update the original AOI/AC defect list that is managed by the defect list manager 602. The updated information may be stored by the defect list manager and extracted by an operator (or through factory automation methods) and provided to the AOI or AC tools. This capability allows connectivity and learning between a mixture of tools.

The above embodiments of the present invention are illustrative and not limiting. Various alternatives and equivalents are possible. Other additions, subtractions or modifications are obvious in view of the present disclosure and are intended to fall within the scope of the appended claims.

What is claimed is:

1. A computerized system implemented method of automatically repairing a panel, the computerized system implemented method comprising:
   detecting a plurality of defects on the panel;
   generating a defect properties list associated with each detected defect by the computerized system;
   classifying each of the detected defects in accordance with the defect's associated properties list and further in accordance with a set of defect classification rules by the computerized system;
   generating a defect class associated with each classified defect by the computerized system; and generating a repair procedure for each detected defect in accordance with the defect's associated defect class and further in accordance with a set of repair classification rules by the computerized system.

2. The computerized system implemented method of claim 1 further comprising:
classifying each of the detected defects further in accordance with information reflecting a zone in which said defect is detected.

3. The computerized system implemented method of claim 2 further comprising:
generating a repair procedure for each detected defect further in accordance with the defect's associated properties list.

4. The computerized system implemented method of claim 3 further comprising:
generating a repair macro for each detected defect in accordance with the defect's associated repair procedure and further in accordance with at least one macro template.

5. The computerized system implemented method of claim 4 further comprising:
generating the repair macro associated with each detected defect further in accordance with the defect's associated properties list.

6. The computerized system implemented method of claim 5 further comprising:
performing a repair operation on each defect if the repair macro associated therewith considers the defect as being repairable.

7. The computerized system implemented method of claim 6 further comprising:
performing a repair operation on each defect if the repair macro associated therewith considers the defect as being repairable and if a human operator verifies the repair.

8. The computerized system implemented method of claim 6 further comprising:
presenting each defect to a human operator for review if the repair macro associated therewith considers that defect as being repairable and the human operator does not initially verify the repair.

9. The computerized system implemented method of claim 8 further comprising:
enabling the human operator to decide whether a repair is needed for each defect if the repair macro associated with that defect considers that defect as being repairable and the human operator does not initially verify the repair.

10. The computerized system implemented method of claim 9 further comprising:
enabling the human operator to decide to proceed with a repair of the defect not initially verified by the human operator.

11. The computerized system implemented method of claim 9 further comprising:
enabling the human operator to abandon repair of the defect not initially verified by the human operator; and
positioning a next defect for repair.

12. The computerized system implemented method of claim 9 further comprising:
updating the defect classification rules.

13. The computerized system implemented method of claim 12 further comprising:
updating the repair classification rules.

14. The computerized system implemented method of claim 13 further comprising:
updating the zone information.

15. The computerized system implemented method of claim 14 further comprising:
updating the at least one macro template.

16. The computerized system implemented method of claim 15 further comprising:
updating a number of defect types that the human operator is enabled to verify.

17. The computerized system implemented method of claim 16 further comprising:
supplying a stored image of defect to test for consistency in judgment of the human operator.

18. An apparatus operative to repair a panel, the apparatus comprising:
a defect property extractor operative to generate a defect properties list associated with each detected defect;
a defect classifier operative to classify each of the detected defects in accordance with the defect's associated properties list and further in accordance with a set of defect classification rules; said defect classifier further operative to generate a defect class associated with each classified defect; and
a repair classifier operative to generate a repair procedure for each detected defect in accordance with the defect's associated defect class and further in accordance with a set of repair classification rules.

19. The apparatus of claim 18 wherein said defect classifier is further operative to classify each of the detected defects in accordance with information reflecting a zone in which said defect is detected.

20. The apparatus of claim 19 wherein said repair classifier is further operative to generate a repair procedure associated with each detected defect in accordance with the defect's associated properties list.

21. The apparatus of claim 20 further comprising:
a repair macro generator operative to generate a repair macro for each detected defect in accordance with the defect's associated repair procedure and further in accordance with at least one macro template.

22. The apparatus of claim 21 wherein said macro generator is further operative to generate a repair macro for each detected defect in accordance with the defect's associated properties list.

23. The apparatus of claim 22 further comprising:
control circuitry operative to receive a repair macro associated with each detected defect and to decide if the defect is repairable; and
a tool controller operative to cause a repair hardware to repair the defect if the defect is decided as being repairable.

24. The apparatus of claim 23 wherein said control circuit is further operative to enable a human operator to verify repair of a defect if the defect is decided as being repairable.

25. The apparatus of claim 23 wherein said control circuitry is further operative to enable a human operator to review a defect decided as being repairable if the human operator does not initially verify a repair.

26. The apparatus of claim 23 wherein said control circuitry is further operative to enable the human operator to decide whether a repair is needed for a defect decided as being repairable and the human operator does not initially verify the repair.

27. The apparatus of claim 26 wherein said control circuitry is further operative to enable the human operator to decide to proceed with a repair of the defect not initially verified by the human operator.

28. The apparatus of claim 26 wherein said control circuitry is further operative to enable the human operator to abandon repair of the defect not initially verified by the human operator.

29. The apparatus of claim 26 further comprising:
a database operative to update the defect classification rules.

30. The apparatus of claim 29 wherein said database is further operative to update the repair classification rules.

31. The apparatus of claim 30 wherein said database is further operative to update the zone information.

32. The apparatus of claim 31 wherein said database is further operative to update the at least one macro template.

33. The apparatus of claim 32 wherein said database is further operative to update number of defect types that the human operator is enabled to verify.

34. The apparatus of claim 33 wherein said database is further operative to supply a stored image of a defect to test for consistency in judgment of the human operator.

35. A computerized system implemented method of automatically repairing a panel, the computerized system implemented method comprising:
detecting a plurality of defects on the panel;
performing a first classification of the detected defects by the computerized system;
performing a second classification of the first classified defects by the computerized system;
combining a first zone data associated with each detected defect with a second predefined zone data to generate a combined zone data for each detected defect; and
filtering the combined zone data associated with each detected defect to generate a filtered zone data associated with a pixel containing the detected defect, said filtered zone data defining a location in which a repair is to be made.

36. The computerized system implemented method of claim 35 further comprising:
selecting a repair template responsive to the second classification.

37. The computerized system implemented method of claim 36 wherein said repair template is a fixed template.

38. The computerized system implemented method of claim 36 wherein said repair template is a variable template.

39. The computerized system implemented method of claim 36 further comprising:
generating a repair macro in response to the repair template;
instructing a repair tool to perform a repair in accordance with the generated repair macro.

40. An apparatus operative to repair a panel, the apparatus comprising:
a defect detector operative to detect defects;
a defect classifier operative to define a defect class for each detected defect;
a repair classifier operative to define a repair class for each classified defect; and
a zone filter operative to filter zone data defined by a combination of a first zone information associated with each detected defect and a second predefined zone information, and to generate in response a filtered zone data associated with each pixel comprising a detected defect, said filtered zone data defining a location in which a repair is to be made.

41. The apparatus of claim 40 further comprising:
a macro generator operative to select a repair template responsive to the defined repair class.

42. The apparatus of claim 41 wherein said repair template is a fixed template.

43. The apparatus of claim 41 wherein said repair template is a variable template.

44. The apparatus of claim 41 further comprising:
a repair tool operative to perform a repair in response to the generated repair macro.

45. A method comprising:
collecting repair information on a panel using a first automated tool, said collecting of defect information comprising:
generating a defect properties list associated with each detected defect;
classifying each of the detected defects in accordance with the defect's associated properties list and further in accordance with a set of defect classification rules;
generating a defect class associated with each classified defect; and
generating a repair procedure for each detected defect in accordance with the defect's associated defect class and further in accordance with a set of repair classification rules; and
performing a repair on a second automated tool using the repair information collected by the first automated tool.

46. An apparatus operative to repair a panel, the apparatus comprising:
a defect detector operative to supply a defect list comprising coordinates of defects present on the panel; and
an automatic defect repair processor comprising:
a defect classifier operative to define a defect class for each detected defect using the defect list;
a repair classifier operative to define a repair class for each classified defect using the defect list; wherein said automatic repair processor is operative to supply information to the defect detector to enable the defect detector to update the defect list.

47. The apparatus of claim 46 wherein said defect detector is disposed in an automated optical inspection system.

48. The apparatus of claim 46 wherein said defect detector is disposed in an array tester.

49. The computer-implemented method of claim 1 wherein the defect class associated with each classified defect comprises a list of features characterizing the defect.

50. The computer-implemented method of claim 1 wherein the defect class associated with each classified defect further comprises at least one derived feature characterizing the defect.

51. The apparatus of claim 18 wherein the defect class associated with each classified defect comprises a list of features characterizing the defect.

52. The apparatus of claim 18 wherein the defect class associated with each classified defect further comprises at least one derived feature characterizing the defect.

* * * * *